United States Patent [19]

Levrai et al.

[11] Patent Number: 5,176,434
[45] Date of Patent: Jan. 5, 1993

[54] BRAKE PRESSURE PROPORTIONING VALVE WITH AN ADDITIONAL VALVE

[75] Inventors: Roland Levrai, Stains; Jacques Dufosse, Aulnay-Sous-Bois, both of France

[73] Assignee: Bendix Europe Services Techniques, Drancy, France

[21] Appl. No.: 666,305

[22] Filed: Mar. 8, 1991

[30] Foreign Application Priority Data

Mar. 29, 1990 [FR] France .................. 90 04005

[51] Int. Cl.⁵ .................... B60T 8/22; B60T 8/32
[52] U.S. Cl. ................... 303/22.5; 188/195; 303/9.69
[58] Field of Search .......... 303/22.1, 22.5, 9.62, 303/9.67-9.69, 24.1; 188/195; 251/57

[56] References Cited

U.S. PATENT DOCUMENTS

| | | | |
|---|---|---|---|
| 4,358,163 | 11/1982 | Young | 303/9.69 |
| 4,364,609 | 12/1982 | Wickham | 188/195 X |
| 4,595,243 | 6/1986 | Gaiser | 303/6 C |
| 4,609,229 | 9/1986 | Edenhofer | 303/9.67 |
| 4,652,058 | 3/1987 | Runkle et al. | 303/6 C |
| 4,673,223 | 6/1987 | Carre et al. | 303/24.1 |
| 4,679,864 | 7/1987 | Myers et al. | 303/6 C |
| 4,707,036 | 11/1987 | Farr | 188/195 X |
| 4,718,734 | 1/1988 | Gaiser | 303/24 R |
| 4,736,989 | 4/1988 | Myers et al. | 303/24.1 X |
| 4,770,471 | 9/1988 | Gaiser | 303/24.1 |
| 4,824,180 | 4/1989 | Levrai | 188/195 X |
| 5,028,094 | 7/1991 | Levrai | 188/195 X |

FOREIGN PATENT DOCUMENTS

| | | |
|---|---|---|
| 3702732 | 8/1988 | Fed. Rep. of Germany . |
| 0039769 | 3/1979 | Japan .................. 188/195 |
| 59-202964 | 11/1984 | Japan . |

Primary Examiner—Matthew C. Graham
Assistant Examiner—Josie A. Ballato
Attorney, Agent, or Firm—Larry J. Palguta; Ken C. Decker

[57] ABSTRACT

The vehicle brake pressure proportioning valve subject to the load of a vehicle and controlled fluidically comprises a piston (18) sliding in a stepped bore made in a body and carrying a normally open shutter arranged between a source of fluid under pressure and an associated brake circuit, the piston (18) being movable counter to a spring under the effect of the pressure of the fluid which tends to close the shutter, and comprising furthermore a sealed control chamber (16) connected to a load sensor (10). The proportioning valve further comprises a normally open additional valve (14) arranged between the chamber (16) and the sensor (10), in order to interrupt communication between the chamber (16) and the sensor (10) during a braking operation.

6 Claims, 3 Drawing Sheets

BRAKE PRESSURE PROPORTIONING VALVE WITH AN ADDITIONAL VALVE

BACKGROUND OF THE INVENTION

The present invention relates to a brake pressure proportioning valve of a vehicle, subject to the load of the vehicle and controlled fluidically.

Such brake pressure proportioning valves have been known to an average person skilled in the art for a very long time.

The document FR-A-2,600,957 describes, for example, a proportioning valve according to the precharacterizing clause of the main claim.

This proportioning valve is of the type comprising a piston sliding in a stepped bore made in a body and carrying a normally open shutter arranged between a source of fluid under pressure and an associated brake circuit, the piston being movable counter to a spring under the effect of the pressure of the fluid which tends to close the shutter, and comprising furthermore a sealed control chamber connected to a load sensor.

Such a proportioning valve has a considerable defect which can become serious in some circumstances. In fact, it is known that such a proportioning valve serves for modulating the pressure of the brake fluid in the rear wheels as a function of the pressure of the source and of the load of the vehicle, in order to prevent a locking of the rear wheels during braking. Now during a braking operation, the rear wheels are, of course, relieved of stress because a load transfer towards the front of the vehicle takes place. Since the cutoff point of the proportioning valve is determined as a result of the setting of the proportioning valve at the factory, and since this setting depends on a chosen compromise taking a particular load transfer into account or not, the braking of the vehicle is therefore at its most efficient only in some highly specific instances.

In fact, if the setting is provided for a medium load transfer, in the event of rapid braking in which the load transfer is greater than the medium load transfer provided, because of the response time inherent in the fluidic connection between the load sensor and the control chamber of the proportioning valve, the latter "sees" a higher load than that which actually exists. The rear wheels are thus braked excessively in relation to what they can support, and this can result in a locking of these rear wheels. This perverse effect is amplified with the amount of braking required and therefore runs completely counter to safety.

If the setting is provided for a maximum load transfer, the opposite occurs, and the rear wheels are not braked sufficiently in relation to what they can support (except during rapid braking). The front wheels thus ensure too high a proportion of the braking of the vehicle, thereby making it necessary to oversize the corresponding brakes and possibly giving rise to a locking of the front wheels in the event of poor adhesion.

SUMMARY OF THE INVENTION

The object of the present invention is to overcome this major disadvantage arising as a result of a setting involving a compromise, by ensuring that the proportioning valve memorizes the load of the vehicle before the load transfer attributable to the braking operation. The cutoff point of the proportioning valve can then be set at the factory independently of the stress relief and is no longer the result of a compromise which can have a perverse effect.

To achieve this, according to the invention, the proportioning valve comprises a normally open additional valve arranged between the chamber and the sensor, in order to interrupt communication between the chamber and the sensor during a braking operation.

Preferably, the valve is controlled by the pressure of the fluid counter to a spring.

Alternatively, the valve is a solenoid valve interrupting communication when the pressurization of the fluid of the source is commanded, or a valve sensitive to the deceleration, the shutter of the latter interrupting communication by inertia.

BRIEF DESCRIPTION OF THE DRAWINGS

The invention will now be described by way of example with reference to the accompanying drawings in which.

In the figures, identical elements bear the same references.

DETAILED DESCRIPTION OF THE INVENTION

Figure 5:
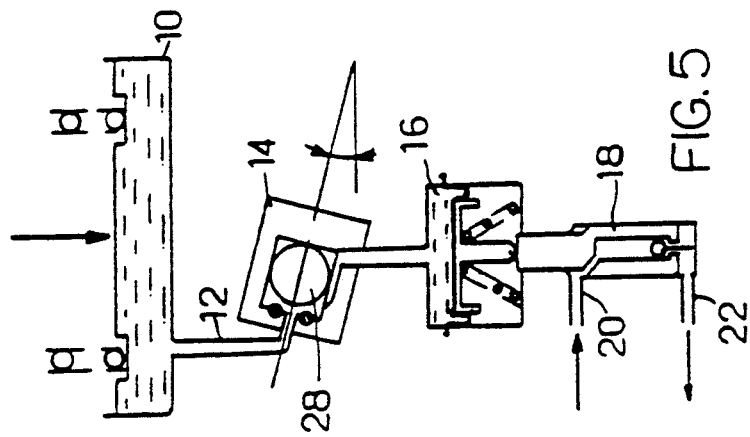
FIGS. 4 and 5 illustrate two other embodiments of the invention.

Referring now to the figures, this proportioning valve comprises a fluidic load sensor 10, for example arranged under the suspension spring of a rear wheel. This sensor 10 usually consists of a sealed pocket filled with a fluid, such as air, oil or water. This pocket is connected by means of a conduit 12 to the sealed control chamber 16 of variable volume of the proportioning valve. This chamber 16 controls the force on a pusher, on which a stepped piston 18 sliding in a bore made in a body is capable of coming to bear in order to change the cutoff point of the shutter which the piston 18 carries. The source of fluid under pressure is connected to the conduit 20, while the associated working circuit is connected to the conduit 22. The functioning of such a proportioning valve is considered to be well known to an average person skilled in the art and will not be repeated in detail here.

In brief, when the source of fluid under pressure is activated, the piston 18 moves in the direction of closing of the shutter which it carries, in order to interrupt communication between the conduits 20 and 22. The closing moment of this shutter is determined by the pressure of the source of fluid under pressure and by the force on the pusher controlled by the control chamber 16.

According to the invention, the proportioning valve comprises an additional valve 14 which is arranged in the conduit 12 and is normally open and which interrupts communication between the load sensor 10 and the control chamber 16 during a braking operation. Thus, during braking, the chamber 16 is as it was before the braking, whatever the load transfer detected by the sensor 10.

Figure 1:
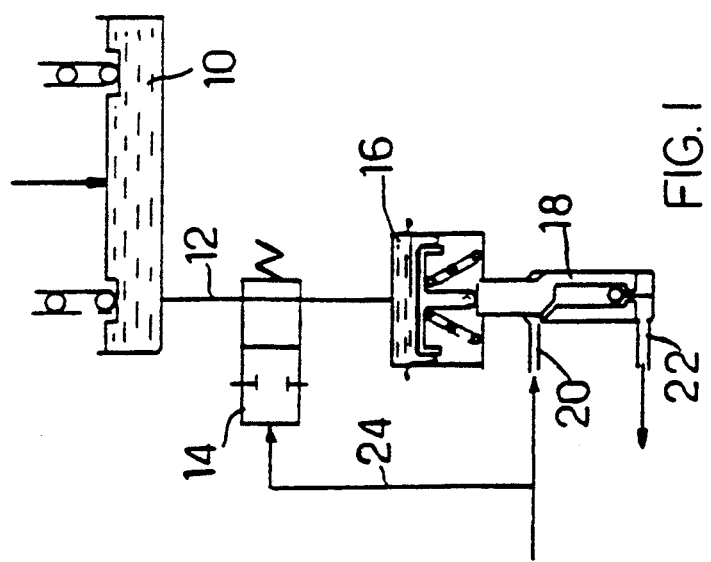
FIG. 1 illustrates diagrammatically a proportioning valve according to a first embodiment of the invention, FIGS. 2 and 3 each show a proportioning valve according to the diagram of FIG. 1 diagrammatically in section.

FIG. 1 shows diagrammatically this additional valve 14 controlled by a piston sensitive to the pressure of the source of fluid under pressure. A conduit 24 therefore connects the conduit 20 to this valve 14, in order to interrupt communication as soon as the pressure of the source reaches a specific threshold.

Figure 2:
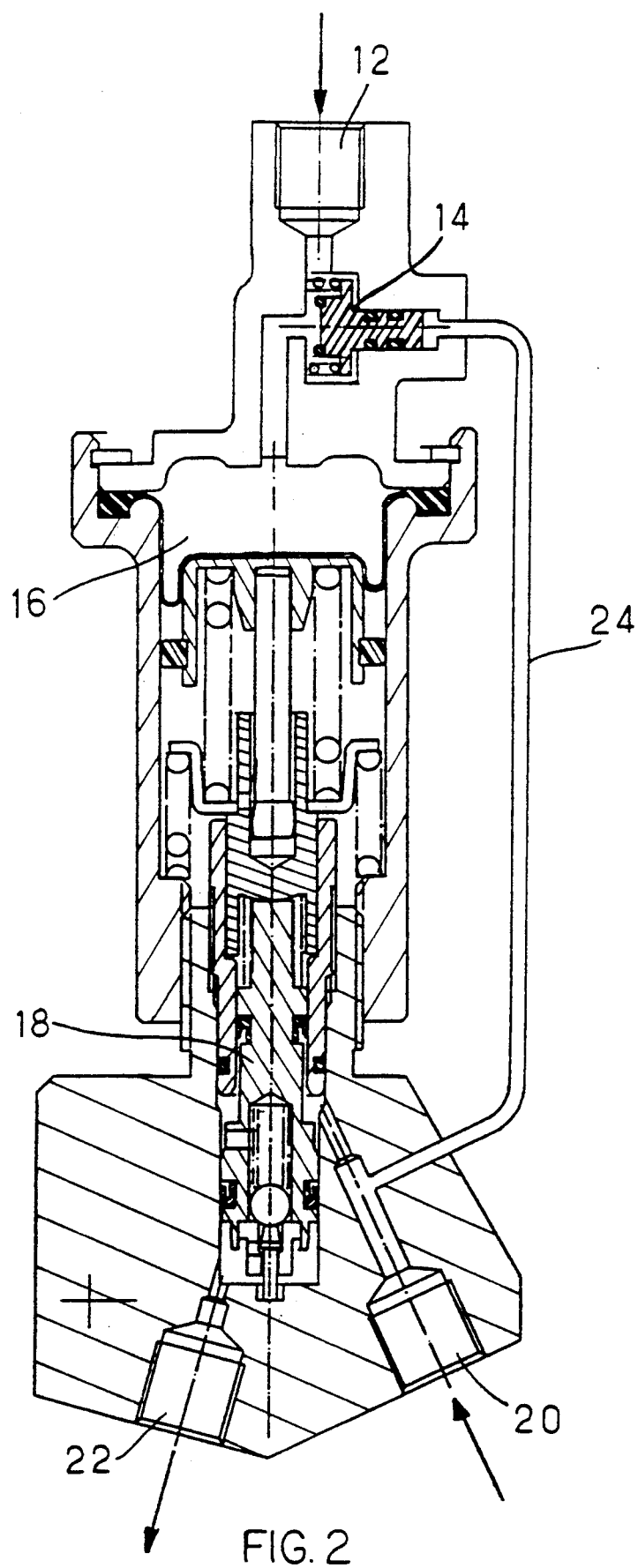
Figure 3:
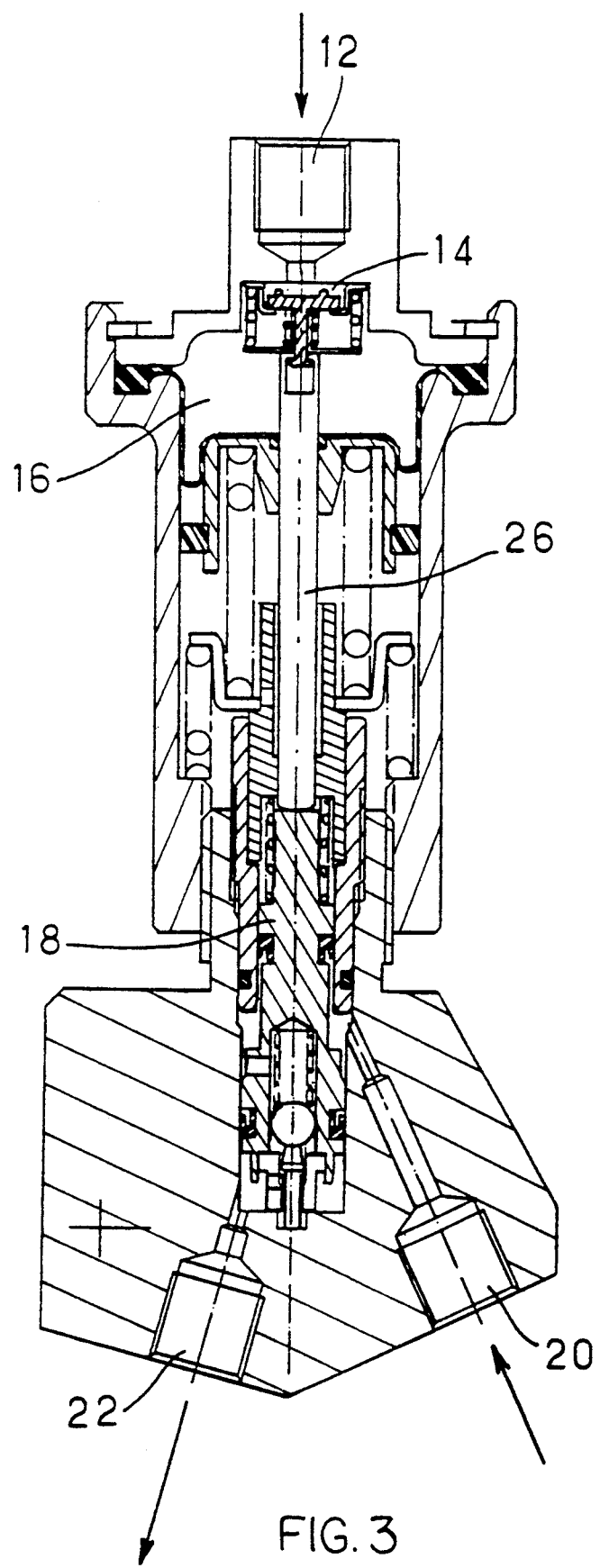

FIGS. 2 and 3 illustrate this embodiment in practical terms. In FIG. 2, the conduit 24 is arranged outside the active part of the actual proportioning valve. While in FIG. 3, the conduits 22 and 24 form only a single conduit, the piston ensuring the closing of the shutter of the valve 14 then being the conventional piston 18, to which is fixed a rod of telescopic type 26 making it possible to close the shutter of the valve 14, while at the same time allowing the movement of the piston, even when the shutter is closed.

The example illustrated in FIG. 2 makes it possible to use conventional proportioning valves, without changes to these (except where the setting is concerned) and to obtain the desired effect simply by adding one component. The same applies to the embodiments illustrated in FIGS. 4 and 5.

Figure 4:
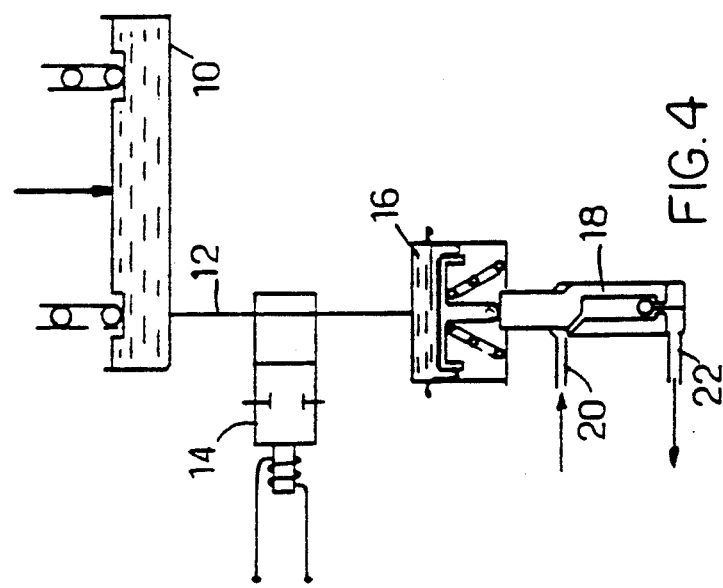

FIG. 4 shows diagrammatically a proportioning valve according to the invention, but of which the additional valve is a solenoid valve controlled, for example, by means of the stop light switch, with which every vehicle is equipped in order to allow stop lights to light up. Thus, as soon as the driver presses on the brake pedal, the chamber 16 is isolated from the sensor 10 so as to obtain the desired effect before the start of braking.

In FIG. 5, the additional valve 14 is a valve sensitive to the deceleration, its axis forming a particular angle with the horizontal. Thus, the shutter consisting of the ball 28 is normally open at rest, and as soon as the vehicle is decelerated the ball 28 closes the conduit 12 by bearing on its seat simply as a result of inertia. An average person skilled in the art will select this solution when he wishes to isolate the chamber 16 after the start of braking.

It will easily be appreciated that an average person skilled in the art can make many modifications to the present invention, without departing from the scope defined by the accompanying claims. For example, the additional valve can have a third position, in which communication between the sensor 10 and the control chamber 16 will not be interrupted, but will simply be reduced by means of a restriction, the load transfer information then being sent to the proportioning valve with a calculated delay.

What we claim is:

1. A vehicle brake pressure porportioning valve subject to the load of a vehicle and controlled fluidically, comprising a piston sliding in a stepped bore in a body and carrying a normally open shutter arranged between a source of fluid under pressure and an associated brake circuit, said piston being movable counter to a spring under the effect of the pressure of said fluid which tends to close said shutter, and a sealed control chamber connected to a vehicle load sensor, said pressure proportioning valve further comprising a normally open additional valve arranged between said sealed control chamber and said vehicle load sensor in order that the additional valve operates to interrupt communication between said sealed control chamber and said vehicle load sensor at the beginning of a braking operation and enable the proportioning valve to operate continually, during said braking operation, according to the load of the vehicle present before an occurrence of a vehicle load transfer attributable to the braking operation.

2. The vehicle brake pressure proportioning valve according to claim 1, wherein said additional valve is controlled by the pressure of said fluid counter to a spring.

3. The vehicle brake pressure proportioning valve according to claim 2, wherein said additional valve comprises a shutter fixed to a second piston to a base of which the fluid under pressure is applied.

4. The vehicle brake pressure proportioning valve according to claim 2, wherein a shutter of said additional valve is actuated by means of a rod of telescopic type connected with the piston of the pressure proportioning valve.

5. The vehicle brake pressure proportioning valve according to claim 1, wherein said additional valve is a solenoid valve interrupting said communication when pressurization of the fluid of said source is commanded.

6. The vehicle brake pressure proportioning valve according to claim 1, wherein said additional valve is a valve sensitive to deceleration, a shutter thereof interrupting said communication by inertia.

* * * * *